US011575631B1

(12) United States Patent
Saraf et al.

(10) Patent No.: US 11,575,631 B1
(45) Date of Patent: Feb. 7, 2023

(54) SYSTEMS AND METHODS FOR COMPOSING AND PROVIDING MEDIA CLIPS USING DISTRIBUTED COMPUTING ARCHITECTURE

(71) Applicant: Verizon Patent and Licensing Inc., Basking Ridge, NJ (US)

(72) Inventors: Rohit Shirish Saraf, Nashua, NH (US); Indraneel Sen, Livingston, NJ (US); Yuk Lun Li, Morganville, NJ (US); Dan Sun, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/402,161

(22) Filed: Aug. 13, 2021

(51) Int. Cl.

| | |
|---|---|
| ***H04L 51/10*** | (2022.01) |
| ***H04L 67/288*** | (2022.01) |
| ***H04L 67/561*** | (2022.01) |
| ***H04L 67/10*** | (2022.01) |

(52) U.S. Cl.
CPC ............ *H04L 51/10* (2013.01); *H04L 67/288* (2013.01); *H04L 67/561* (2022.05); *H04L 67/10* (2013.01)

(58) Field of Classification Search
None
See application file for complete search history.

(56) References Cited

U.S. PATENT DOCUMENTS

| | | | | |
|---|---|---|---|---|
| 10,841,974 | B1 * | 11/2020 | Young | H04W 48/16 |
| 2019/0014458 | A1 * | 1/2019 | Kodaypak | H04L 41/022 |
| 2019/0042319 | A1 * | 2/2019 | Sood | G06F 21/74 |
| 2020/0084564 | A1 * | 3/2020 | Mindlin | H04S 3/008 |
| 2020/0267518 | A1 * | 8/2020 | Sabella | H04W 12/06 |
| 2021/0201333 | A1 * | 7/2021 | Rachamadugu | H04L 43/0894 |
| 2022/0053270 | A1 * | 2/2022 | Ko | G06F 3/165 |
| 2022/0067959 | A1 * | 3/2022 | Uss | G06T 19/006 |

FOREIGN PATENT DOCUMENTS

WO WO-2021221317 A1 * 11/2021

OTHER PUBLICATIONS

A. Martin, R. Viola, M. Zorrilla, J. Flórez, P. Angueira and J. Montalbán, "MEC for Fair, Reliable and Efficient Media Streaming in Mobile Networks," in IEEE Transactions on Broadcasting, vol. 66, No. 2, pp. 264-278, Jun. 2020, doi: 10.1109/TBC.2019.2954097. (Year: 2020).*

* cited by examiner

*Primary Examiner* — Uzma Alam

(57) ABSTRACT

A system may include a first device and a second device. The first device may be configured to select a second device for providing a first User Equipment device (UE) with media clips in accordance with Application Programming Interface (API) calls from a second UE. The second device may be configured to: receive a first API call from the second UE to generate and provide a media clip; generate the media clip; and send the generated media clip to the first UE.

20 Claims, 8 Drawing Sheets

100

102-1
208-1
MEC
212
102-2
208-2
DATA NETWORK
214

100
102-1
208-1
MEC
212
102-2
208-2
DATA NETWORK
214

200
DATA NEWORK 214
CORE NETWORK 206
ACCESS NEWORK 204
208
IAB NODES 210
MEC 212
UE 102-1
APP 216-1
APP 218-1
UE 102-2
APP 216-2
APP 218-2

FIG. 8A
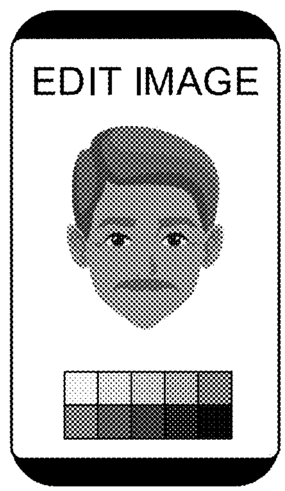
FIG. 8B
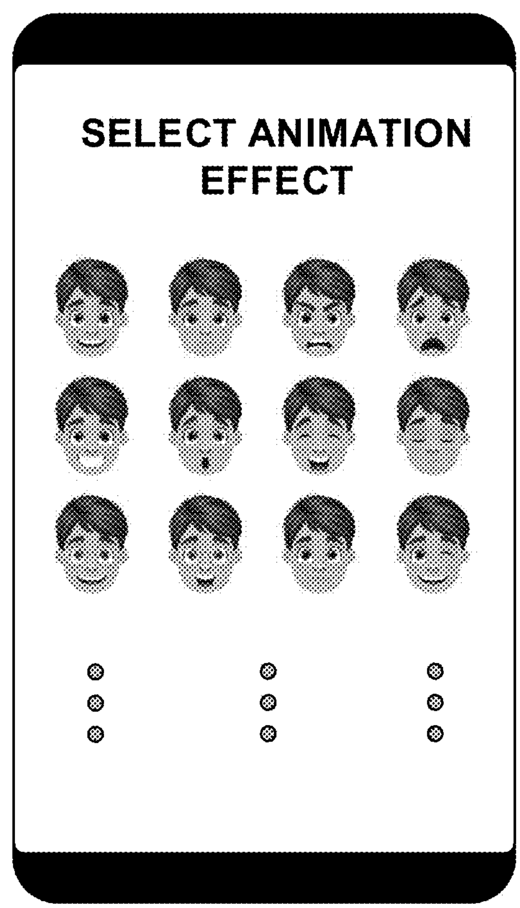
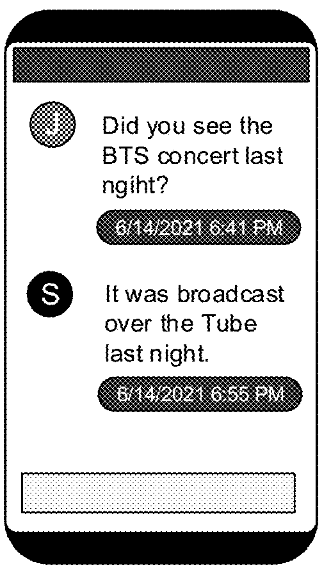
FIG. 8C

SYSTEMS AND METHODS FOR COMPOSING AND PROVIDING MEDIA CLIPS USING DISTRIBUTED COMPUTING ARCHITECTURE

BACKGROUND INFORMATION

Multi-access Edge Computing (MEC) clusters provide cloud-computing capabilities at the edge of the network. Characteristics of MEC clusters are ultra-low latency and high bandwidth. Because of ultra-low latency, MEC clusters can provide real-time access to a radio network to applications running on User Equipment devices (UEs), such as mobile phones. Example uses cases for MEC clusters include video analytics, location services, Internet-of-Things (IoT) applications, augmented-reality support, local server-side computing, and local content-caching and distribution.

BRIEF DESCRIPTION OF THE DRAWINGS

FIGS. 8A-8C show example user interfaces of applications, which run on User Equipment devices (UEs), according to an implementation.

DETAILED DESCRIPTION OF EXAMPLE EMBODIMENTS

The following detailed description refers to the accompanying drawings. The same reference numbers in different drawings may identify the same or similar elements.

Figure 1:
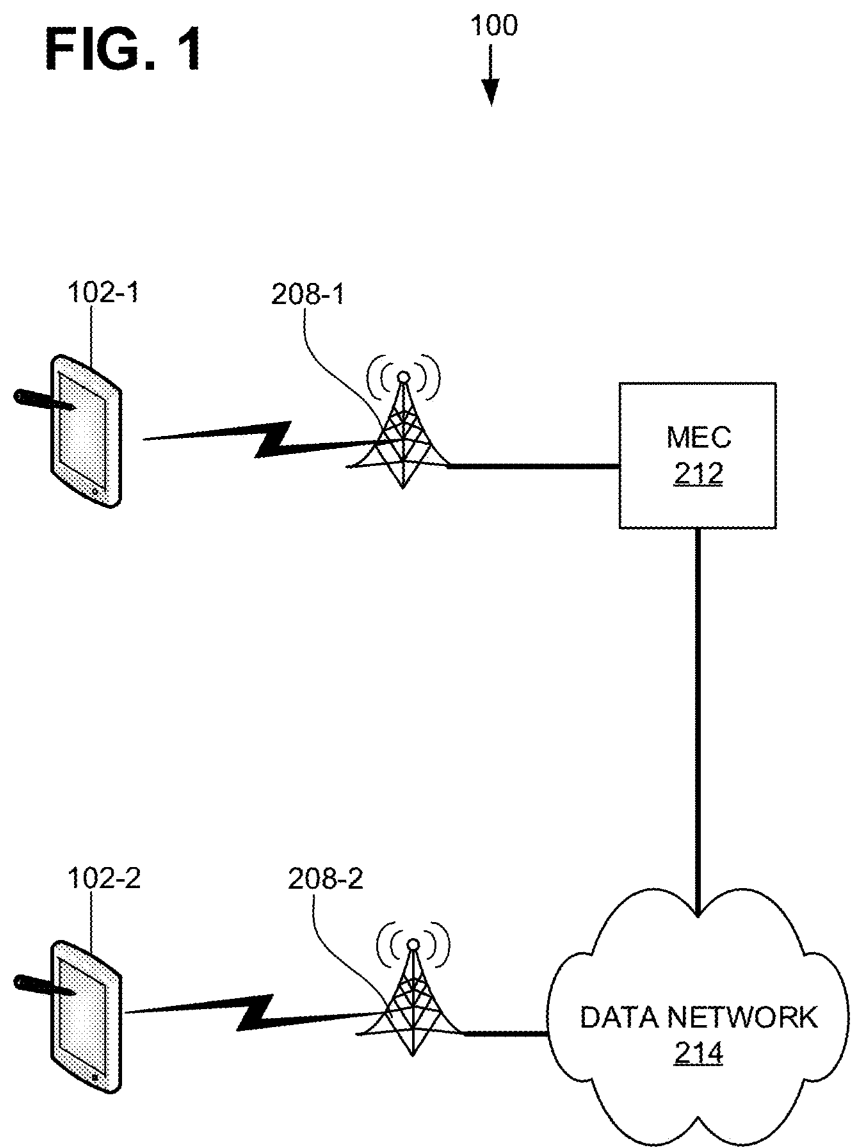
FIG. 1 illustrates environments described herein.

The systems and methods described herein relate to distributed computing. More specifically, the systems and methods described herein relate to composing and providing media clips to User Equipment devices (UEs) in distributed computing environments. FIG. 1 illustrates an example embodiment relating to the concept. As shown in FIG. 1, a system 100 includes a UE 102-1 communicating with UE 102-2 over a network. UE 102-1 and UE 102-2 are wirelessly attached to base station 208-1 and base station 208-2 (also referred to as wireless stations 208-1 and 208-2), respectively. When UE 102-1 sends data or information to UE 102-2, UE 102-1 may request servers on a Multi-Access Edge Computing (MEC) network 212 (also referred to as MEC cluster 212. MEC servers 212, or simply MEC 212) and data network 214 to provide media clips to be used with the data. When UE 102-2 receives the data from UE 102-1 and the media clips from the servers, UE 102-2 displays (or plays) the data and the media clips. Depending on the implementation, in displaying or showing the data and the media clips, UE 102-2 may replace corresponding portions of the data with the media clips.

With servers (either MEC servers 212 or cloud based servers of data network 214 (not shown)) providing the content (i.e., the media clips), system 100 allows UEs 102 to avoid having to generate the content and avoids having to transport the content over the full length of the communication path between UE 102-1 and UE 102-2. The high bandwidth of the network, large computational powers of the devices in MEC 212 and network 214, and low latency of MEC 212 enable system 100 to generate and send the content to UE 102-2 in near real-time.

In one embodiment, system 100 may be implemented as a system for providing emoji media clips. In the implementation, UE 102-1/UE 102-2 may include an emoji editing application capable of creating data components (referred to herein as "emoji media components" or simply "emoji components"). Emoji components may include, for example. an avatar of a user of UE 102-1 or 102-2, images/models of the user at different ages, cartoon versions of the user, etc. For each emoji, UE 102-1/UE 102-2 may send the corresponding emoji components to a server at data network 214 or to a proxy clip server at MEC 212. The clip server/proxy clip server may store the emoji components at network 214 and/or MEC 212.

UE 102-1 and/or 102-2 may include a second application (herein referred to as a client) for exchanging messages that include tags representing locations, within the messages, at which emoji media clips may be displayed. When the second application at UE 102-1 sends a message to UE 102-2, the client makes Application Programming Interface (API) calls to the clip server at network 214 or the proxy clip server at MEC 212 for each of the tags, to request an emoji media clip corresponding to the tag. Each call may include an emoji clip specification, such as an identifier for the emoji component (e.g., an identifier for an avatar or a model) and identifiers for particular media effects. Identifiers for media effects may include identifiers for animation (e.g., an animation type, such as clapping, crying, dancing, etc.), visual effects (e.g., scaling, rotation, etc.), acoustic effects, etc.).

When the clip server at data network 214 or the proxy clip server at MEC 212 receives the API call, the clip server/proxy clip server may generate the emoji media clip based on the clip specification. After the generation of the emoji media clips, the clip server/proxy clip server may forward information about the generated emoji media clips to UE 102-1.

When the client at UE 102-1 receives the information, the client may send the message and the information to a different client in UE 102-2 via the clip server/proxy clip server. That is, the clip server/proxy clip server may forward the message and emoji media clip information (or "emoji media clip data") from UE 102-1 to UE 102-2. After the receipt of the message and information, UE 102-2 may use the information to accesses the emoji media clip from the clip server/proxy clip server, to play the emoji media clips at appropriate locations within the displayed messages.

In other implementations, applications may be implemented as a game client, an augmented reality client, or another type of client application that requests media clips from a clip server/proxy clip server on data network 214 or MEC 212. In contrast to the "emoji client", these client applications may request media clips from the clip server/proxy clip server to support logic different from the messaging logic associated with clients. For example, when implemented as a game client, an application may receive a user input that indicates a movement of a character in a Role Playing Game (RPG) scene. In response, the application may request a media clip depicting the motion from the clip server/proxy clip server.

Figure 2:
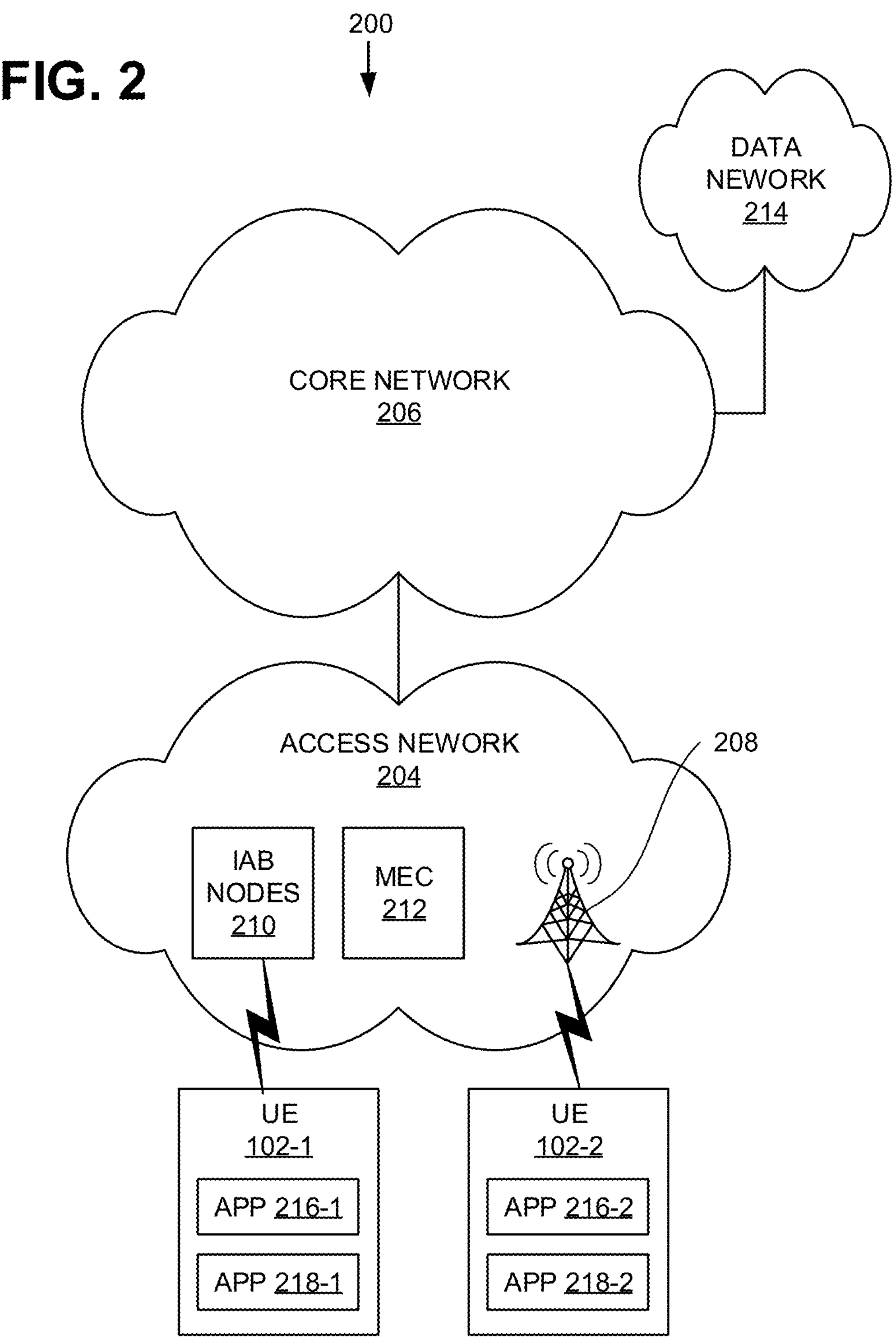
FIG. 2 illustrates an example network environment in which the systems and methods described herein may be implemented.

FIG. 2 illustrates an example network environment 200 in which the systems and methods described herein may be implemented. As shown, environment 200 may include UEs 102-1 and 102-2 (individual and generically referred to as UE 102 and collectively as UEs 102), an access network 204, a core network 206, and a data network 214. UE 102 may include a wireless communication device, a mobile terminal, or a fixed wireless access (FWA) device. Examples of UE 102 include: a smart phone; a tablet device; a wearable computer device (e.g., a smart watch); a laptop computer; an autonomous vehicle with communication capabilities; a portable gaming system; and an Internet-of-Thing (IoT) device.

In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204. UE 102 may have the capability to select a particular network slice from which UE 102 can request a service. UE 102 may have the capability to connect to different RAT access devices, such as Long-Term Evolution (LTE) or 5G base stations.

UEs 102-1 and 102-2 may each include instances of applications 216 and 218. In some implementations, application 216 and application 218 may be integrated into one application. Applications 216 and 218 may register with the clip servers/proxy clip server at MEC 212 and/or data network 214. Application 216 may allow a user to manage (e.g., create, edit, delete, retrieve, store, etc.) media or content clip components, such as an avatar, a 3D model of a character in a game, a sound, and/or other components that may be used to generate a media clip (also referred to as content clip). Application 216 may forward the content clip components to a clip server or a proxy clip server at data network 214 or MEC 212 for storage. For example, when implemented as an emoji editing client, application 216 may send emoji components to the clip server/proxy clip server. In some implementations, application 216 may use the PUBLISH/SUBSCRIBE mechanism to send or retrieve clip components from the clip server/proxy clip server.

Application 218 may communicate with another application 218 ("second application") (on another UE 102). Based on a message from application 218-1, for example, the other application 218-2 may display or play a media clip from a clip server at data network 214 or a proxy clip server at MEC 212. For example, assume that applications 218 are implemented as clients, and that application 218-1 prepares and processes a text message that includes emojis. When application 218-1 in UE 102-1 detects an emoji (or a tag) in the message, application 218-1 may make an API call to the clip server or proxy clip server. The clip server or the proxy clip server may respond by generating a corresponding media clip and information about the media clip. The proxy clip server or the clip server may send the information to application 218-1. In response, application 218-1 may forward the message and the information to application 218-2 at UE 102-2. When application 218-2 is displaying the message, based on the information, application 218-2 at UE 102-2 may access the emoji media clip from the clip server/proxy clip server and play the emoji media clips.

In other embodiments, application 218 may be implemented as a game client, an augmented reality client, or another type of client. For example, as a game client, application 218-1 may request a clip server/proxy clip server to render a scene, an audio clip, or another type of media clip. When the clip server or the proxy clip server receives the API call from application 218-1, the clip server/proxy clip server may generate the requested scene, sound, or another type of media clip based on the clip specification. The clip specification may identify the clip components and the effects that are to be generated using the components.

Access network 204 may allow UE 102 to access core network 206. To do so, access network 204 may establish and maintain, with participation from UE 102, an over-the-air channel with UE 102; and maintain backhaul channels with core network 206. Access network 204 may convey information through these channels, from UE 102 to core network 206 and vice versa.

Access network 204 may include an LTE radio network, a 5G radio network and/or another advanced radio network. These radio networks may operate in many different frequency ranges, including millimeter wave (mmWave) frequencies, sub 6 GHz frequencies, and/or other frequencies. Access network 204 may include many wireless stations, Central Units (CUs) and Distributed Units (DUs) and Integrated Access and Backhaul (IAB) nodes. In FIG. 2, these are depicted as a wireless station 208 and IAB nodes 210. Wireless station 208 and IAB nodes 210 may establish and maintain an over-the-air channel with UEs 102 and backhaul channels with core network 206.

Wireless station 208 may include an LTE, 5G, or another type of wireless station (e.g., evolved Node B (eNB), next generation Node B (gNB), etc.) that includes one or more Radio Frequency (RF) transceivers. A wireless station 208 that is attached to an IAB node 210 via a backhaul link is herein referred to as IAB donor 208. As used herein, the term "IAB donor" refers to a specific type of IAB node. IAB donor 208 may have the capability to act as a router.

IAB nodes 210 may include one or more devices to relay signals from an IAB donor 208 to UE 102 and from UE 102 to IAB donor 208. An IAB node 210 may have an access link with UE 102 and have a wireless and/or wireline backhaul link to other IAB nodes 210 and/or IAB donor 208. An IAB node 210 may have the capability to operate as a router for other IAB nodes 210, for exchanging routing information with IAB donor 208 and other IAB nodes 210 and for selecting traffic paths.

As further shown, access network 204 may include a MEC network (also referred to has "MEC cluster" ro simply as "MEC") 212. MEC 212 may be located geographically close to wireless stations 208 or an IAB node 210, and therefore also close to UEs 102 serviced by the wireless station 208 or IAB node 210. Due to its proximity to UEs 102, MEC 212 may be capable of providing services to UEs 102 with minimal latency. Depending on the implementations, MEC 212 may provide many core network functions at network edges. In other implementations, MEC 212 may be positioned at other locations (e.g., in core network 206) at which MEC 212 can provide computational resources for improved performance. As discussed above, MEC 212 may include various components to support provisioning of media clips, such as emoji media clips, game-scene media clips, audio clips, etc. These components are described below with reference to FIG. 4.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, a (Public Land Mobile Network) (PLMN), or a combination of networks. Core network 206 may allow the delivery of Internet Protocol (IP) services to UE 102, and may interface with other networks, such as data network 214.

Data network 214 may include networks that are external to core network 206. In some implementations, data network 214 may include packet data networks, such as an Internet Protocol (IP) network. In still another implementation, data network 214 may be part of core network 206. As discussed above, data network 214 may include various components to support provisioning of media clips, such as emoji media clips, game-scene media clips, audio clips, etc. These components are described below with reference to FIG. 3.

For clarity, FIG. 2 does not show all components that may be included in network environment 200 (e.g., routers, bridges, wireless access points, additional networks, additional UEs 102, wireless station 208, IAB nodes 210, MEC 212, etc.). Depending on the implementation, network environment 200 may include additional, fewer, different, or a different arrangement of components than those illustrated in FIG. 2. Furthermore, in different implementations, the configuration of network environment 200 may be different. For example, wireless station 208 may not be linked to IAB nodes 210 and may operate in frequency ranges (e.g., sub-6 GHz) different from or same as those used by IAB nodes 210 (e.g., mmWave or another frequency range).

Figure 3:
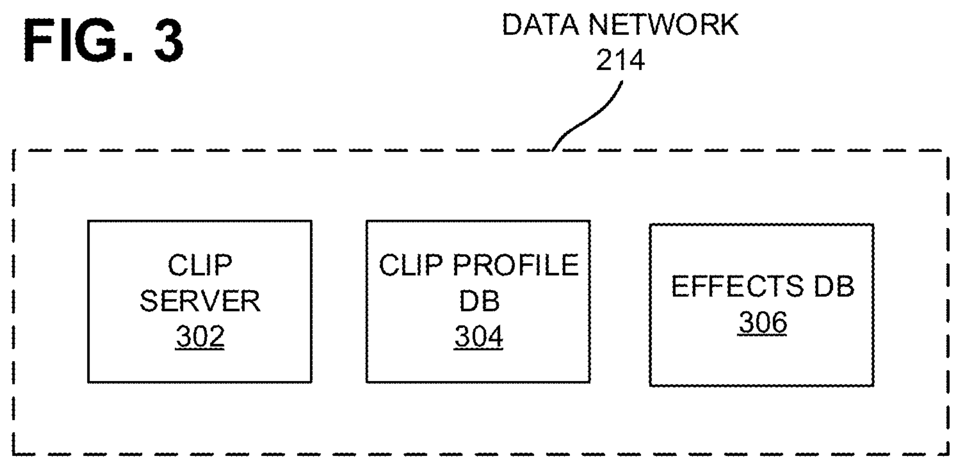
FIGS. 3 and 4 illustrate example functional components, in an embodiment, of a system in a data network and in a Multi-Access Edge Computing (MEC) network.

FIG. 3 illustrates example functional components, of the system for providing media clips, in data network 214. As shown, data network 214 may include a clip server 302, clip profile database (DB) 304, and an effects database DB 306. Depending on the implementation, data network 214 may include additional or fewer components than those illustrated in FIG. 3. In other implementations, multiple components shown in FIG. 3 may be implemented as one component; or alternatively, one component in FIG. 3 may be implemented as multiple components.

Clip server 302 may allow application 216 on UE 102 to manage (e.g., edit, update, store, delete, retrieve, etc.) clip components. In addition, clip server 302 may allow application 216 or 218 to register at clip server 302. Depending on the implementation, clip server 302 may support WebRTC to stream media clips that it generates.

After application 218 registers at clip server 302, clip server 302 may receive API calls from application 218. The API call may request clip server 302 to generate a media clip. Upon receipt of the call, clip server 302 may either generate the clip or look up a second clip server 302 that is closest to the destination UE 102 and offload the task of generating the media clip to the second clip server 302. The second clip server 302 may then generate the media clip using a clip specification provided in the API call and shared by the first clip server 302. The clip specification may identify the clip components in clip profile DB 304 and effects (to be generated using the clip components) defined in effects DB 306. A clip server 302 may provide information regarding the generated media clip and/or stream or forward the media clip to UEs 102.

Clip profile DB 304 may store, for each registered UE 102 or user, clip components. Application 216 on UE 102 may manage the clip components in clip profile DB 304. For example, via application 216-1, UE 102-1 may create an avatar, edit the avatar, and store the avatar in clip profile DB 304. UE 102-1 may also retrieve the avatar, update the avatar, or delete the avatar in clip profile DB 304.

Effects DB 306 may include instructions for creating a particular media effects using clip components in clip DB 304. In some implementations, there may be multiple effects DBs 306, where each effects DB 306 supports different variations of the effect. For example, there may be an effects DB 306 for different types of animations and another effects DB 306 to support other effects, such as sound, or another type of effect.

For example, when implemented as an emoji effects database, effects DB 306 may include instructions for generating animations using an avatar in clip profile DB 304. The clip specification in each API call from application 218 to the server 302/proxy clip server may include an identifier corresponding to a particular animation type. For example, when implemented as an emoji effects DB 306, an API call to the server 302 may provide an ID that specifies what type of animation is to be generated from the avatar (e.g., clapping, crying, laughing, etc.). Another effects DB 306 may include instructions for generating another type of effect based on the avatar. In a different implementation, an API call to the server 302 may specify generating a scene based on 3D models stored in clip profile DB 304.

Figure 4:
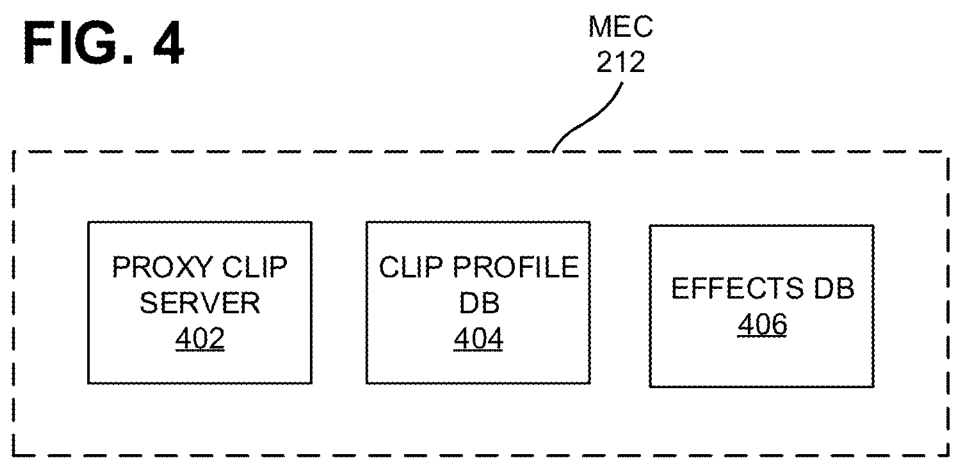

FIG. 4 illustrates example functional components of the system in MEC 212 according to an implementation. As shown, the components of system 100 in MEC 212 include a proxy clip server 402, a clip profile DB 404, and an effects DB 406. The functionalities of proxy clip server 402, clip profile DB 404, and effects DB 406 are similar to the functionalities of server 302, clip profile DB 304, and effects DB 306.

In contrast to clip server 302, however, proxy clip server 404 is located on a MEC 212 at an edge of the provider network or another MEC 212 that can optimally service UEs 102. Also, unlike clip server 302, proxy clip server 402 may be instantiated when the clip server 302 at data network 214 identifies the MEC 212 that is best-suited to service the UEs 102 (e.g., the MEC 212 coupled to wireless station 208 to which UE 102 is attached or the MEC 212 that has the lowest latency for the UE 102) and instructs the operating system or the supervisory program at the best-suited MEC 212 to create the proxy clip server 402. Once instantiated, proxy clip server 402 may permit UEs 102 that are to receive its services to register with the proxy clip server 402.

In contrast to clip profile DB 304 and effects DB 306, clip profile DB 404 and effects DB 406 may include only portions of the data in clip profile DB 304 and effects DB 306. In particular, when clip server 302 instantiates proxy clip server 402 to service particular UEs 102, clip server 302 may also instruct the operating system or the supervisory program at MEC 212 to instantiate clip profile DB 404 and effects DB 406 with needed data. If proxy clip server 402, clip profile DB 404, and/or effects DB 406 already exist on the best suited MEC 212, clip server 302 may transfer information needed to service the UE 102 (e.g., registration information, a portion of clip profile DB 304, and a portion of effects DB 306).

Figure 5:
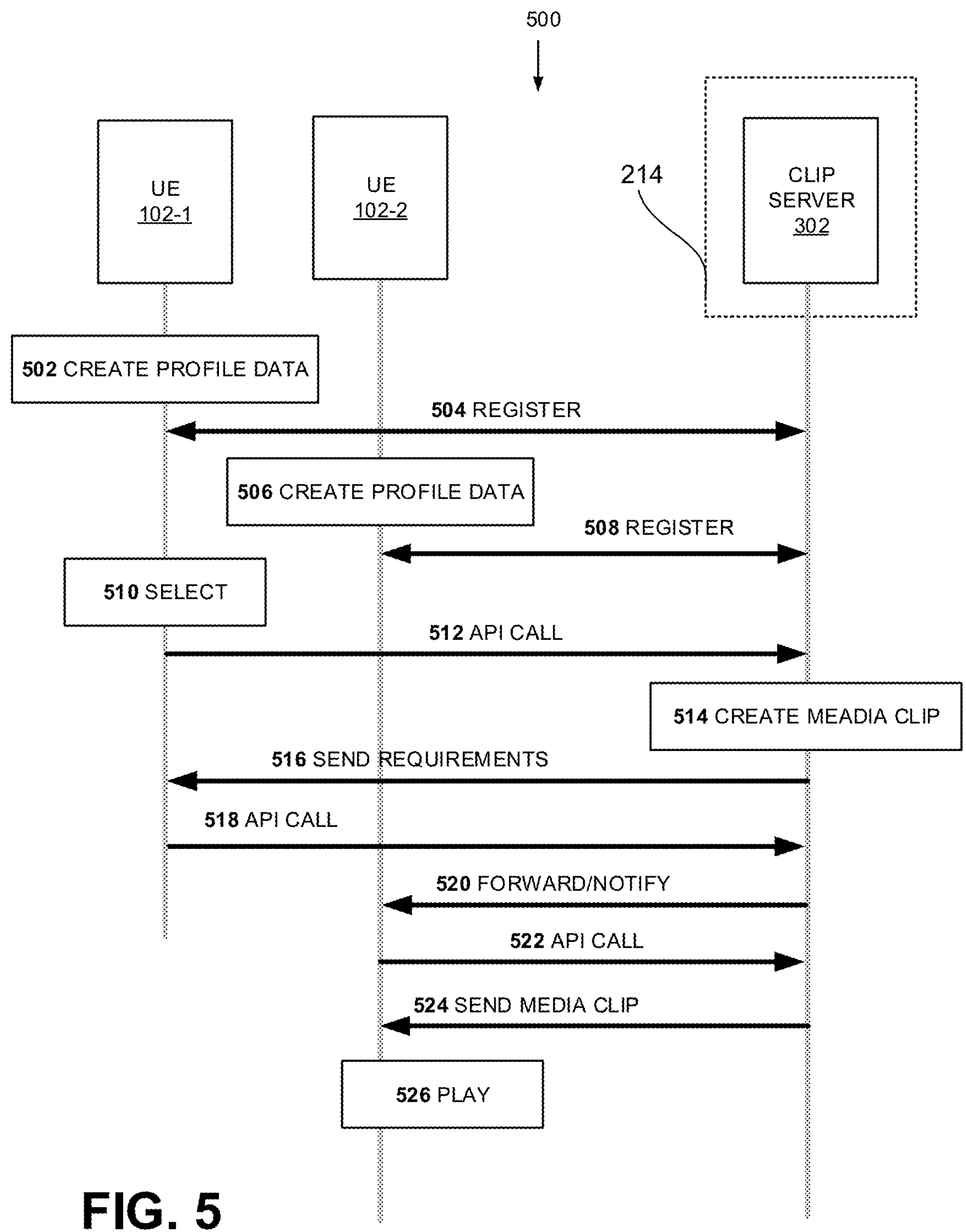
FIGS. 5-7 illustrate example processes for composing and providing media clips according to different implementations.

FIG. 5 illustrates an example process 500 for composing and providing media clips according to an implementation. Process 500 includes actions by and messages between UE 102-1, UE 102-2, and clip server 302. FIG. 5 does not show every network component that is involved in the communications between UEs 102 and clip server 302, every process or task performed by UEs 102 and clip server 302, and every message between UEs 102 and clip server 302. Assume that UE 102-1 and UE 102-2 are in close proximity to one another and that their applications 216 and 218 server side computational requirements (e.g., latency requirements) are met by clip server 302.

As shown, process 500 may include UE 102 creating profile data (block 502) and registering at clip server 302 (arrow 504). Creating user profile data may include creating an image, a 3D-model, sample sound, or another media clip component. Once a user and/or UE 102 is registered at clip server 302, an ID for UE 102 or the user is associated with any clip component uploaded to clip profile DB 304 via clip server 302. For example, assuming clip server 302 is implemented as an emoji clip server, UE 102-1 may register with emoji clip server 302 and upload emoji components. Although FIG. 5 shows registering 504 as occurring after profile data creation, depending on the implementation, UE 102 may create profile data after the registration.

Process 500 may further include UE 102-2 creating profile data (block 506) and registering (arrow 508). As with profile data creation 502 and registration 504, profile data creation 506 and registration 508 may occur in a different order than illustrated. For example, UE 102-2 may register prior to UE 102-1 registration, create profile data 506 before registration 502, etc.

Process 500 may further include application 218 (e.g., application 218-1 running on UE 102-1) selecting media clip components and effects (block 510). For example, application 218 may receive user input for selecting a media clip component and effects associated with the clip component. In one example, assume that a user has composed a text message that includes an emoji or emoji tag. Application 218-1 may select an avatar and an animation type (e.g., crying or laughing) based on the emoji/tag. In another example, when implemented as a game client, application 218-1 may receive user input for moving a character within a scene and select, based on input, 3D models within the scene and coordinates for the character.

After the selection, application 218 may make an API call to clip server 302 (arrow 512). The API call may convey, to clip server 302, information about the selection made at block 510. The API call may include a media clip specification that indicates, to clip server 302, the selected clip components and effects. For example, in the emoji example, the API call may specify a particular avatar and an index corresponding to a particular animation (e.g., laughing).

Upon receipt of the call, clip server 302 may create a media clip (block 514) based on the clip specification provided with the API call. In the emoji example, clip server 302 may obtain an identifier for the avatar and an index associated with the desired animation from the clip specification. Clip server 302 may use the avatar ID to retrieve the avatar from clip profile DB 304 and use the index to retrieve the instructions for creating the animation from effects DB 306. Thereafter, clip server 302 may apply the instructions to the avatar to generate the animation—the emoji media clip.

After generating the media clip, clip server 302 may package information or data associated with the media clip (e.g., bandwidth requirement, a URI at which the media clip can be accessed, etc.) and forward the data to UE 102-1 (arrow 516).

Application 218-1 at UE 102-1 constructs a message that includes the media clip data. In the emoji example, application 218-1 may construct a revised text message from the original text message, replacing emoji tags with tags that include emoji media clip data provided by clip server 302.

Application 218-1 may then make another API call to clip server 302 (arrow 518) with a message. When clip server 302 receives the call, clip server 302 may forward the message to application 218-2 at UE 102-2 (arrow 520) (e.g., send a notification). At UE 102-2, in response to the forwarded message, for each tag or media clip information, UE 102-2 may determine a desired/required bandwidth and the desired/required media playing quality. Application 218-2 may forward the bandwidth information and the quality information (i.e., requirements or what is desired) for each of the media clips in a reply or via an API call (arrow 522). In response, clip server 302 may stream the media clip at the quality level consistent with the quality and the bandwidth requirement specified by application 218-2 in the reply (arrow 524). Application 218-2 may then play the received media clip (block 526).

In the emoji example, application 218-2 may make an API call with a text message that includes the emoji clip information from clip server 302. When clip server 302 receives the call, clip server 302 may forward the text message and the information to application 218-2. In response to the message, for each emoji or emoji clip information, application 218-2 may determine the desired bandwidth and the desired emoji media clip playing quality. Application 218-2 may forward the bandwidth and play quality information to server 302 for each of the emoji media clips. When server 302 streams the emoji media clips in accordance with the requirements, application 218-2 may play the emoji media clips at appropriate locations (corresponding to the tag locations) within the text message displayed to the user.

Figure 6:
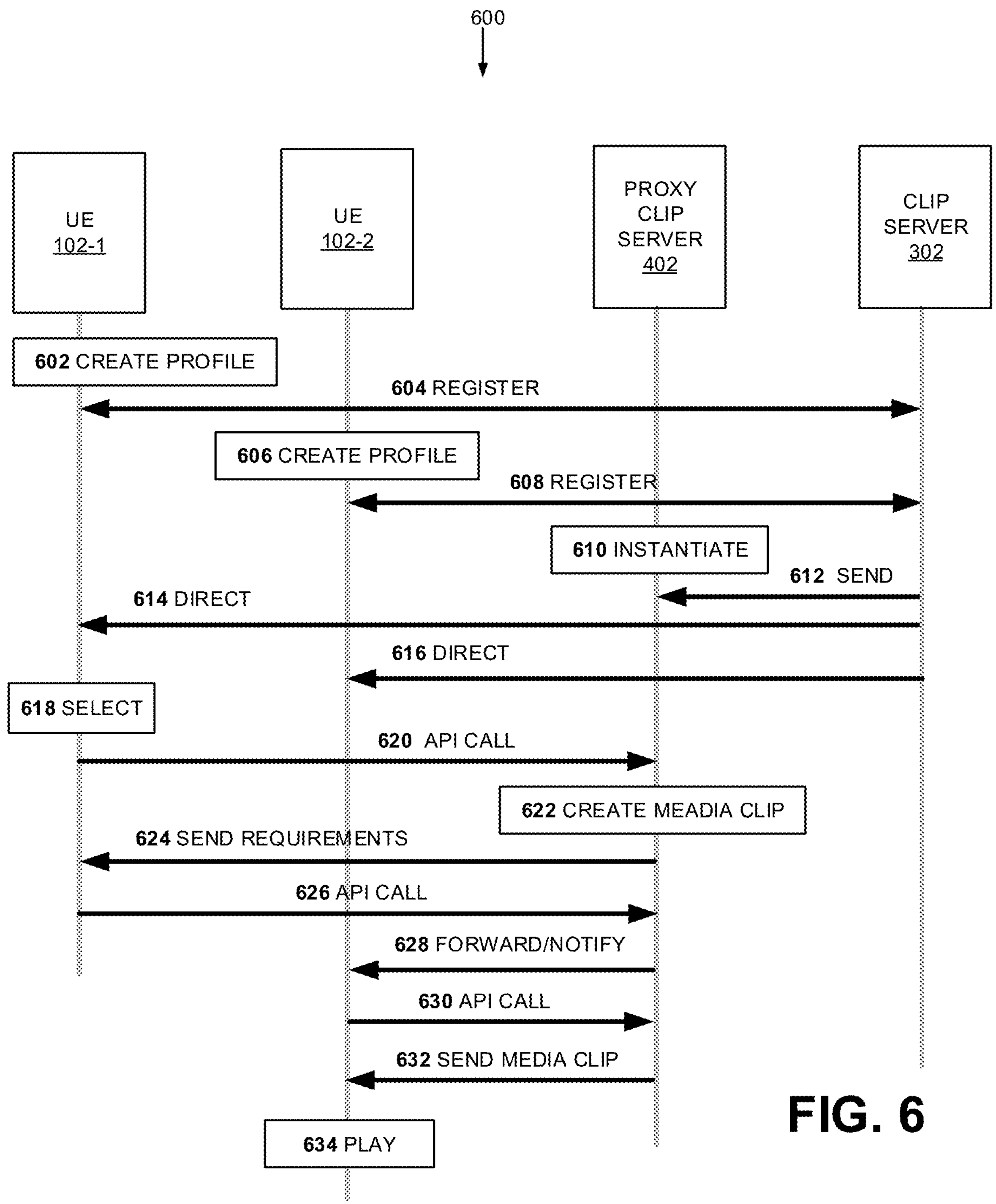

FIG. 6 illustrates example process 600 for composing and providing media clips according to another implementation. Process 600 includes actions by and messages between UE 102-1, UE 102-2, clip server 302, and proxy clip server 402. FIG. 6 does not show every network component that is involved in the communications between UEs 102, clip server 302 and proxy clip server 402; every process or task performed by UEs 102, clip server 302, and proxy clip server 402; and every message between UEs 102, clip server 302, and proxy clip server 402. Assume that UE 102-1 and UE 102-2 are in close proximity to one another and that their applications 216 and 218 computational requirements (e.g., latency requirements) are met by proxy clip server 402.

Messages and actions associated with blocks 602 and 606 and arrows 604 and 608 are similar to those for blocks 502 and 506 and arrows 504 and 508 in FIG. 5. In contrast to FIG. 5, however, after UEs 102-1 and 102-2 each register with clip server 302, clip server 302 identifies the MEC 212 that can best service UEs 102-1 and 102-2 and instructs the operating system or the supervisory program on the MEC 212 to instantiate proxy clip server 402. The operating system or the supervisory system may then instantiate proxy clip server 402 (block 610). If proxy clip server 402 already exists on the MEC 212, clip server 302 may not instantiate proxy clip server 402 and merely forward needed information (e.g., registration information).

After the instantiation or receipt of the registration information, clip server 302 may send information needed by proxy clip server 402 to generate and provide media clips to UE 102-1 and/or UE 102-2 (arrow 612) and have proxy clip server 402 store the information in local profile DB 404 and effects DB 406. The information may include profile data or effects instructions stored in clip profile DB 304 and/or effects DB 306. Clip server 302 may not send data that already exists in profile DB 404 and effects DB 406 from profile DB 304 and effects DB 306.

After sending the information, clip server 302 may direct or notify UE 102-1 of proxy clip server 402, so that if UE 102-1 needs media clips to be played at UE 101-2, UE 102-1 will make API calls to proxy clip server 402, to have proxy clip server 402 generate and provide media clips to UE 102-2. In addition, clip server 302 may direct or notify UE 102-2 to have UE 102-2 make API calls to proxy clip server 402, to access media clips from proxy clip server 402 in accordance with API calls from UE 102-1 (arrows 614 and 616). After receiving the directions from clip server 302, UE 102-1 and UE 102-2 may interact with proxy clip server 402. The interactions represented by blocks and/or arrows 618-634 are similar to those represented by blocks and/or arrows 510-526 in FIG. 5, respectively, except that in FIG. 6, proxy clip server 402 takes the place of clip server 302 in FIG. 5.

Figure 7:
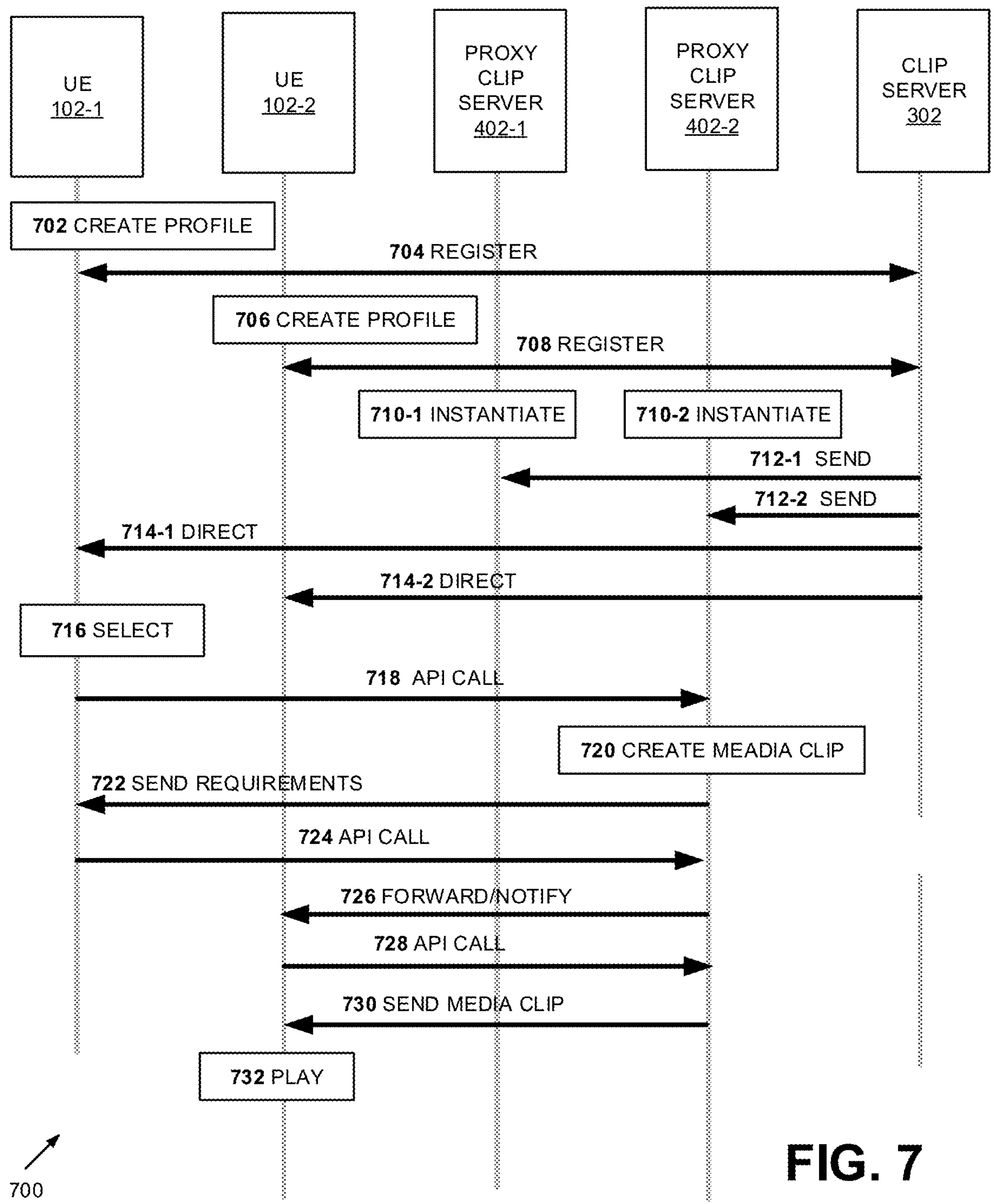

FIG. 7 illustrates example process 700 for composing and providing media clips according to another implementation. Process 700 includes actions by and messages between UE 102-1, UE 102-2, clip server 302, proxy clip server 402-1 and proxy clip server 402-2. Proxy clip server 402-1 would be on a MEC 212 that is best suited for servicing UE 102-1 and Proxy clip server 402-2 would be on a different MEC 212 that is best suited for servicing UE 102-2 (e.g., lowest latency). FIG. 7 does not show: every network component that is involved in the communications between UEs 102, clip server 302 and proxy clip servers 402; every process or task performed by UEs 102, clip server 302, and proxy clip servers 402; and every message between UEs 102, clip server 302, and proxy clip servers 402. Assume that UE 102-1 and UE 102-2 are not in close proximity to one another and that their computational requirements (e.g., latency requirements) are met by proxy clip servers 402-1 and 402-2, respectively.

Messages and actions associated with blocks 702 and 706 and arrows 704 and 708 are similar to those for blocks 502 and 506 and arrows 504 and 508 in FIG. 5. In contrast to FIG. 5, however, after registration of UEs 102-1 and 102-2, clip server 302 identifies the MECs 212 that are best suited to service UE 102-1 and 102-2. Clip server 302 instructs the operating system and/or the supervisory program on the MEC 212-1 best suited to service UE 102-1 to instantiate proxy clip server 402-1 and the operating system or the supervisory program on the MEC 212-2 best suited to service UE 102-2 to instantiate proxy clip server 402-2. If proxy clip server 402-1 and/or proxy server 402-2 already exists on the MEC 212-1 or MEC 212-2, clip server 302 may not instantiate proxy clip server 402-1 (at 710-1) and/or proxy clip server 402-2 (at 710-2), however, and merely forward needed registration information to the existing proxy clip server 402-1 and/or 402-2.

After the instantiations or the transmission of the registration information, clip server 302 sends information needed by proxy clip server 402-1 to generate and provide media clips to UE 102-1 and information needed by proxy clip server 402-2 to generate and provide media clips to UE 102-2 (arrows 712-1 and 712-2). That is, clip server 302 sends profile data that pertains to UE 102-1 to proxy clip server 402-2 and profile data that pertains to UE 102-2 to proxy clip server 402-1. Clip server 302 may not send data that already exists in profile DB 404 and effects DB 406 in MEC 212-1 and/or 212-2 from profile DB 304 and effects DB 306. Each of proxy clip servers 402-1 and 402-2 may store the information in its local profile DB 404 and effects DB 406.

After sending the information, clip server 302 may notify or direct UE 102-1 to make API calls to proxy clip server 402-2, to have proxy clip server 402-2 provide media clips to UE 102-2 in accordance with API calls from UE 102-1. In addition, clip server 302 may notify or direct UE 102-2 to receive media clips, from proxy clip server 402-2, defined by UE 102-1 and indicated by UE 102-1 to be received by UE 102-2 (arrows 714-1 and 714-2). Furthermore, clip server 302 may notify or direct UE 102-2 to make API calls to proxy clip server 402-1, to have proxy clip server 402-1 provide media clips to UE 102-1 in accordance with API calls from UE 102-2. In addition, clip server 302 may notify or direct UE 102-1 to receive media clips, from proxy clip server 402-1, defined by UE 102-2 and indicated by UE 102-2 to be received by UE 102-1 (arrows 714-1 and 714-2). After receiving the directions from clip server 302, UE 102-1 and UE 102-2 may interact with proxy clip server 402-2 and proxy clip server 402-1, respectively.

The interactions represented by blocks and/or arrows 716-732 are similar to those represented by blocks and/or arrows 510-526 in FIG. 5, except that proxy clip server 402-2 takes the place of clip server 302 in FIG. 5. This is because proxy clip server 402-2 is to provide the media clips to UE 102-2. When UE 102-2 is to have UE 102-1 play media clips specified by UE 102-2, UEs 102 would interact with proxy clip server 402-1 in the manner similar to those specified by blocks and/or arrows 716-732 except that proxy clip server 402-1 would take the place of clip server 302 in FIG. 5 and the roles of UE 102-1 and 102-2 would be reversed.

FIG. 8A-8C show example user interfaces of applications that run on UEs 102 according to an implementation. FIG. 8A shows a Graphical User interface (GUI) for application 216 for managing media clip components when application 216 is implemented for managing emojis. Using the interface, a user may create and edit an avatar. FIG. 8B shows a GUI for application 218 for selecting an animation type for an emoji. As illustrated, each face shown on the display screen corresponds to a type of animation and an index associated with the animation type (e.g., laughing, crying, etc.). When a user selects a particular face, a tag (within the message) that corresponds to the emoji incorporates the index for the selected animation type. When application 218 processes the message for transmission, application 218 may make an API call to clip server 302. In response, clip server 302 may generate and provide an emoji media clip to the destination UE 102. FIG. 8C illustrates another GUI for application 218. Application 218 is implemented as a texting program, into which the user can type in a message and insert a desired emoji or a tag that specifies the avatar and the desired effects.

Figure 9:
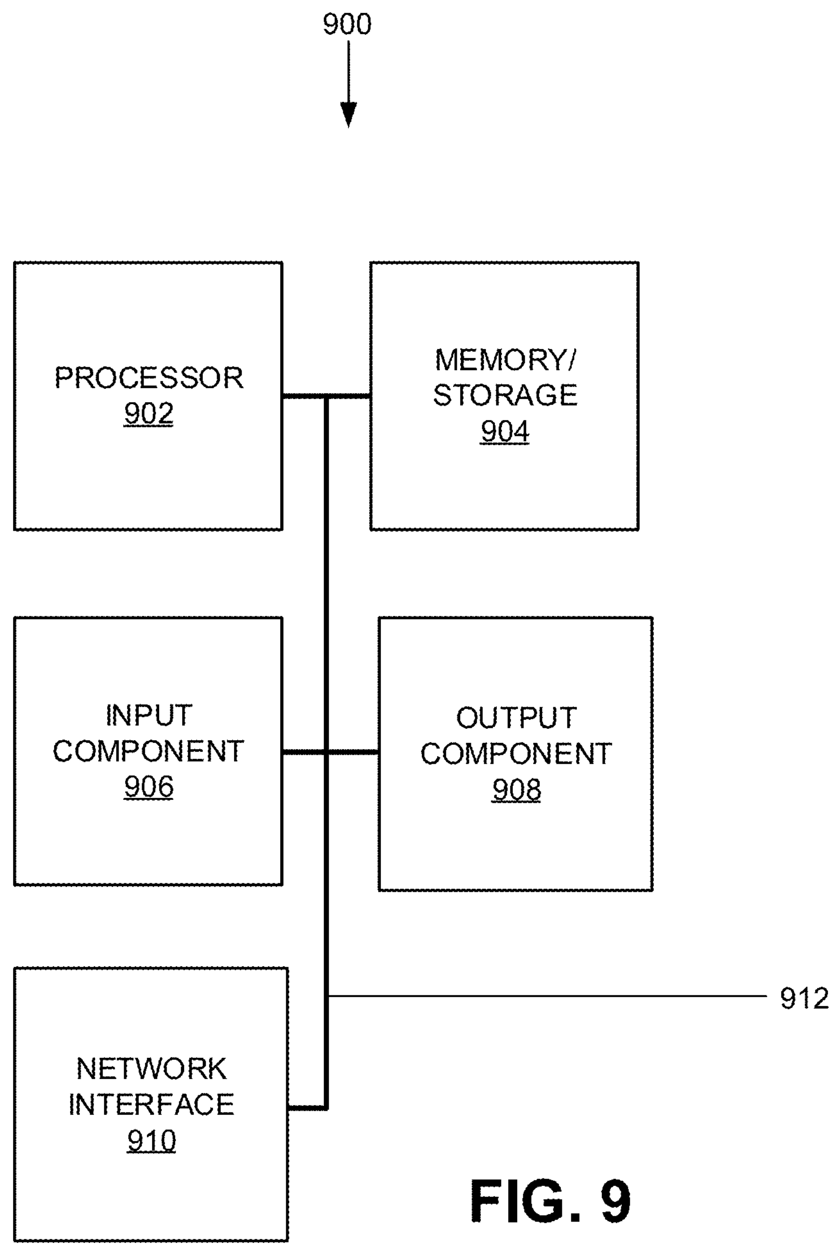
FIG. 9 depicts example components of an example network device, according to an implementation.

FIG. 9 depicts example components of an example network device 900. Network device 900 corresponds to or is included in UE 102, IAB nodes 210, and any of the network components of FIGS. 1-7, and 8A-8C (e.g., a router, a network switch, servers, gateways, wireless station 208, IAB nodes 210, MEC 212, clip server 302, profile DB 304, effects DB 306, proxy clip server 402, profile DB 404, effects DB 406, etc.). As shown, network device 900 includes a processor 902, memory/storage 904, input component 906, output component 908, network interface 910, and communication path 912. In different implementations, network device 900 may include additional, fewer, different, or a different arrangement of components than the ones illustrated in FIG. 12. For example, network device 900 may include a display, network card, etc.

Processor 902 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 900 and/or executing programs/instructions.

Memory/storage 904 may include static memory, such as read only memory (ROM), and/or dynamic memory, such as random access memory (RAM), or onboard cache, for storing data and machine-readable instructions (e.g., programs, scripts, etc.).

Memory/storage 904 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 904 may be external to and/or removable from network device 900. Memory/storage 904 may include, for example, a Universal Serial Bus (USB) memory stick, a dongle, a hard disk, off-line storage, a Blu-Ray® disk (BD), etc. Memory/storage 904 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 906 and output component 908 may provide input and output from/to a user to/from network device 900. Input and output components 906 and 908 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 900.

Network interface 910 may include a transceiver (e.g., a transmitter and a receiver) for network device 900 to communicate with other devices and/or systems. For example, via network interface 910, network device 900 may communicate with wireless station 208.

Network interface 910 may include an Ethernet interface to a LAN, and/or an interface/connection for connecting network device 900 to other devices (e.g., a Bluetooth interface). For example, network interface 910 may include a wireless modem for modulation and demodulation.

Communication path 912 may enable components of network device 900 to communicate with one another.

Network device 900 may perform the operations described herein in response to processor 902 executing software instructions stored in a non-transient computer-readable medium, such as memory/storage 904. The software instructions may be read into memory/storage 904 from another computer-readable medium or from another device via network interface 910. The software instructions stored in memory or storage (e.g., memory/storage 904, when executed by processor 902, may cause processor 902 to perform processes that are described herein. For example, UE 102, clip server 302, profile DB 304, effects DB 306, proxy clip server 402, profile DB 404, and effects DB 406 may each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks and arrows have been described above with regard to the processes illustrated in FIGS. 5-7 the order of the blocks and arrows may be modified in other implementations. In addition, non-dependent blocks and arrows may represent actions and messages that can be performed or exchanged in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:

a first device, which is included in a data network, configured to:

select a second device, included in a Multi-Access Computing (MEC) network, for providing a first User Equipment device (UE) with media clips in accordance with Application Programming Interface (API) calls received from a second UE;

send a first message to the first UE, wherein the first message indicates that the first UE is to receive media clips, defined by the second UE, from the second device; and send a second message to the second UE, wherein the second message indicates that the second UE is to provide clip specifications for media clips that the first UE is to receive from the second device; and the second device configured to:

receive a first API call from the second UE to generate and provide a media clip;

generate the media clip at the second device; and send the generated media clip from the second device to the first UE, wherein the data network is different from the MEC network.

2. The system of claim 1, wherein the first device is further configured to:

instantiate a media clip server on the second device; and
send a media component, created by the second UE and initially sent to the first device, to the second device.

3. The system of claim 1, wherein when the second device generates the media clip, the second device is configured to:
apply instructions to a media component to generate the media clip; and
obtain data pertaining to the media clip.

4. The system of claim 3, wherein when the second device sends the media clip to the first UE, the second device is configured to:
receive a second API call from the second UE to provide the media clip to the first UE;
forward the data to the first UE;
receive a third API call from the first UE; and
send the media clip to the first UE.

5. The system of claim 4, wherein the media component includes at least one of:
an avatar;
a three-dimensional model; or
acoustic data.

6. The system of claim 1, wherein the first device is further configured to:
select a third device for providing the second UE with media clips in accordance with API calls from the first UE.

7. The system of claim 6, wherein the first device is further configured to:
send a third message to the second UE, wherein the third message indicates that the second UE is to receive media clips defined by the first UE, from the third device, and
send a fourth message to the first UE, wherein the fourth message indicates that the first UE is to receive media clips, defined by the first UE, from the third device.

8. The system of claim 6, wherein the first device is further configured to:
instantiate a media clip server on the third device; and
send a media component, created by the first UE and initially sent to the first device, to the third device.

9. A method comprising:
selecting, by a first device included in a data network, a second device, included in a Multi-Access Edge Computing (MEC) network, for providing a first User Equipment device (UE) with media clips in accordance with Application Programming Interface (API) calls received from a second UE;
sending, by the first device, a first message to the first UE, wherein the first message indicates that the first UE is to receive media clips, defined by the second UE, from the second device;
sending, by the first device, a second message to the second UE, wherein the second message indicates that the second UE is to provide clip specifications for media clips that the first UE is to receive from the second device;
receiving, by the second device, a first API call from the second UE to generate and provide a media clip;
generating, by the second device, the media clip at the second device; and
sending, by the second device, the generated media clip from the second device to the first UE,
wherein the data network is different from the MEC network.

10. The method of claim 9, further comprising:
instantiating, by the first device, a media clip server on the second device; and
sending, by the first device, a media component, created by the second UE and initially sent to the first device, to the second device.

11. The method claim 9, wherein generating the media clip comprises:
applying, by the second device, instructions to a media component to generate the media clip; and
obtaining, by the second device, data pertaining to the media clip.

12. The method of claim 11, wherein sending the media clip to the first UE comprises:
receiving, by the second device, a second API call from the second UE to provide the media clip to the first UE;
forwarding, by the second device, the data to the first UE;
receiving, by the second device, a third API call from the first UE; and
sending, by the second device, the media clip to the first UE.

13. The method of claim 12, wherein the media component includes at least one of:
an avatar;
a three-dimensional model; or
acoustic data.

14. The method of claim 9, further comprising:
selecting, by the first device, a third device for providing the second UE with media clips in accordance with API calls from the first UE.

15. A non-transitory computer-readable medium comprising computer-executable instructions, when executed by one or more processors, that cause the one or more processors to:
select, at a first device included in a data network, a second device, included in a Multi-Access Edge Computing (MEC) network, for providing a first User Equipment device (UE) with media clips in accordance with Application Programming Interface (API) calls received from a second UE;
send, from the first device, a first message to the first UE, wherein the first message indicates that the first UE is to receive media clips, defined by the second UE, from the second device;
send, from the first device, a second message to the second UE, wherein the second message indicates that the second UE is to provide clip specifications for media clips that the first UE is to receive from the second device;
receive, at the second device, a first API call from the second UE to generate and provide a media clip;
generate, at the second device, the media clip; and
send, from the second device, the generated media clip from the second device to the first UE,
wherein the data network is different from the MEC network.

16. The non-transitory computer-readable medium of claim 15, wherein when the media clip is generated, the one or more processors are to:
apply instructions to a media component to generate the media clip; and
obtain data pertaining to the media clip.

17. The non-transitory computer-readable medium of claim 16, wherein when the media clip is sent from the second device to the first UE, the one or more processors are to:
receive a second API call from the second UE to provide the media clip to the first UE;
forward the data to the first UE;
receive a third API call from the first UE; and
send the media clip to the first UE.

18. The non-transitory computer-readable medium of claim 17, wherein the media component includes at least one of:

an avatar;

a three-dimensional model; or acoustic data.

19. The non-transitory computer-readable medium of claim 15, wherein the one or more processors are further to:

select a third device for providing the second UE with media clips in accordance with API calls from the first UE.

20. The non-transitory computer-readable medium of claim 19, wherein the one or more processors are further to:

instantiate a media clip server on the third device; and send a media component, created by the first UE and initially sent to the first device, to the third device.

* * * * *